United States Patent [19]

Barrett et al.

[11] Patent Number: 5,784,752
[45] Date of Patent: Jul. 28, 1998

[54] ROPE CLEANING DEVICE

[75] Inventors: John D. Barrett, Brooklyn, N.Y.; Christopher J. Elliott, Manchester, Conn.

[73] Assignee: Otis Elevator Company, Farmington, Conn.

[21] Appl. No.: 666,709

[22] Filed: Jun. 18, 1996

[51] Int. Cl.⁶ ................................................ A46B 15/00
[52] U.S. Cl. ...................................... 15/256.6; 15/88
[58] Field of Search ........................ 15/77, 88, 88.2, 15/88.4, 256.52, 256.53, 256.5, 256.51, 256.6, 160; 474/92; 198/496

[56] References Cited

U.S. PATENT DOCUMENTS

| | | | |
|---|---|---|---|
| 984,336 | 2/1911 | Woodbury | 15/41.1 |
| 1,300,323 | 4/1919 | Zdancewicz | 15/41.1 |
| 1,790,573 | 1/1931 | Conte | 15/256.6 |
| 1,842,278 | 1/1932 | Mazzella | 15/256.6 |
| 1,883,223 | 10/1932 | Wood | 15/256.6 |
| 2,951,557 | 2/1960 | Jung . | |
| 3,931,991 | 1/1976 | Marchello . | |
| 4,530,597 | 7/1985 | Itaya et al. | 15/256.52 |
| 5,036,563 | 8/1991 | Liebing | 15/256.6 |
| 5,386,882 | 2/1995 | Friend . | |

FOREIGN PATENT DOCUMENTS

| | | | |
|---|---|---|---|
| 596527 | 8/1959 | Italy | 15/88 |
| 9102189 | 2/1991 | WIPO . | |

Primary Examiner—Tony G. Soohoo

[57] ABSTRACT

A cleaning device for removing sludge build-up from elevator ropes includes a brush assembly secured within a housing and shielded by a guard. The sludge is continuously removed from the elevator ropes as the elevator ropes pass through the bristles of the brush. The housing includes a removable receptacle where the removed sludge is collected. The receptacle is periodically removed and cleaned. The cleaning device also includes a cleaning bar which removes the sludge from the brush to provide more effecting cleaning of the elevator ropes.

16 Claims, 1 Drawing Sheet

ROPE CLEANING DEVICE

TECHNICAL FIELD

The present invention relates to elevator ropes and, more particularly, to a cleaning device therefor.

BACKGROUND OF THE INVENTION

The ropes in elevator systems are typically treated with a lubricating oil to prolong the life of the ropes. The oil lubricates the inside wires and reduces wear caused by friction between the wires. However, the lubricating oil collects dust and dirt, forming a dark, heavy sludge build-up. As the elevator ropes travel through the hoistway, covered with the sludge, a number of potential problems arise. One problem with sludge covering the elevator rope is that the sludge build-up prevents new lubricating oil from penetrating through to the core of the elevator rope, therefore increasing the wear and reducing the life of the rope. Another problem with the sludge is that it leaves permanent stains on the rugs, carpeting and clothing resulting in numerous customer complaints. Since the sludge is splashed throughout the machine room as the elevator ropes travel through the hoistway, sludge often remains on the mechanic's clothing when the mechanic leaves the machine room and walks through the lobbies of the buildings, thereby permanently damaging the floor coverings on the site. Yet another downside of sludge build-up is potential increased fire hazard because the sludge is flammable.

Currently, most ropes are cleaned manually. Manual cleaning of the ropes is a labor intensive and messy process. It is very time consuming and often not effective to manually clean many long ropes located in very tight places with restricted access to the ropes. Also, the sludge gets on mechanics' clothing and shoes and is spread throughout the lobbies of buildings causing many customer complaints.

One type of cleaning device for elevator ropes is described in U.S. Pat. No. 5,386,882 to Friend, entitled Wire Rope Cleaning Brush Apparatus. The patent discloses a cleaning device having a pair of rectangular brushes secured in a U-shape frame. As the rope travels through the pair of brushes, the brushes rub against the elevator rope removing sludge therefrom. However, the cleaning device does not resolve many of the existing problems. As the rope travels through the cleaning device at a certain speed, the sludge splatters the hoistway. As the sludge covers the hoistway, the problem of damaging floor coverings increases and so does the potential fire hazard. Also, the rectangular brushes accumulate sludge build up and become ineffective. Therefore, there is still a need for an effective cleaning device to remove sludge from the elevator ropes.

DISCLOSURE OF THE INVENTION

It is an object of the present invention to provide a cleaning device for removing sludge from elevator ropes without contaminating the hoistway and the machine room.

It is a further object of the present invention to provide a cleaning device for removing sludge from elevator ropes wherein the cleaning device itself does not require cleaning.

According to the present invention, a cleaning device for removing sludge from elevator ropes includes a round brush assembly rotatably secured in a housing with the housing having a removable receptacle. The brush assembly is enclosed partially within the housing and partially within a guard to prevent sludge from contaminating the hoistway. As the elevator ropes pass through the brush assembly through a plurality of slots formed within the guard, the rotating brush removes sludge from the elevator ropes. The removed sludge is deposited in the receptacle which is periodically emptied during regular maintenance service. Thus, the cleaning device of the present invention effectively removes sludge from the elevator ropes without contaminating the hoistway.

One feature of the cleaning device is a cleaning bar which is secured within the housing and extends the width of the brush. The cleaning bar continuously removes the sludge from the brush and impedes motion of the brush assembly.

One major advantage of the present invention is that the brush is cleaned continuously by the cleaning bar. This feature allows more effective cleaning of the elevator ropes by the brush. Another advantage of the present invention is that the cleaning bar also functions as a clutch providing resistance for the brush to result in relative motion between the brush and the elevator ropes.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
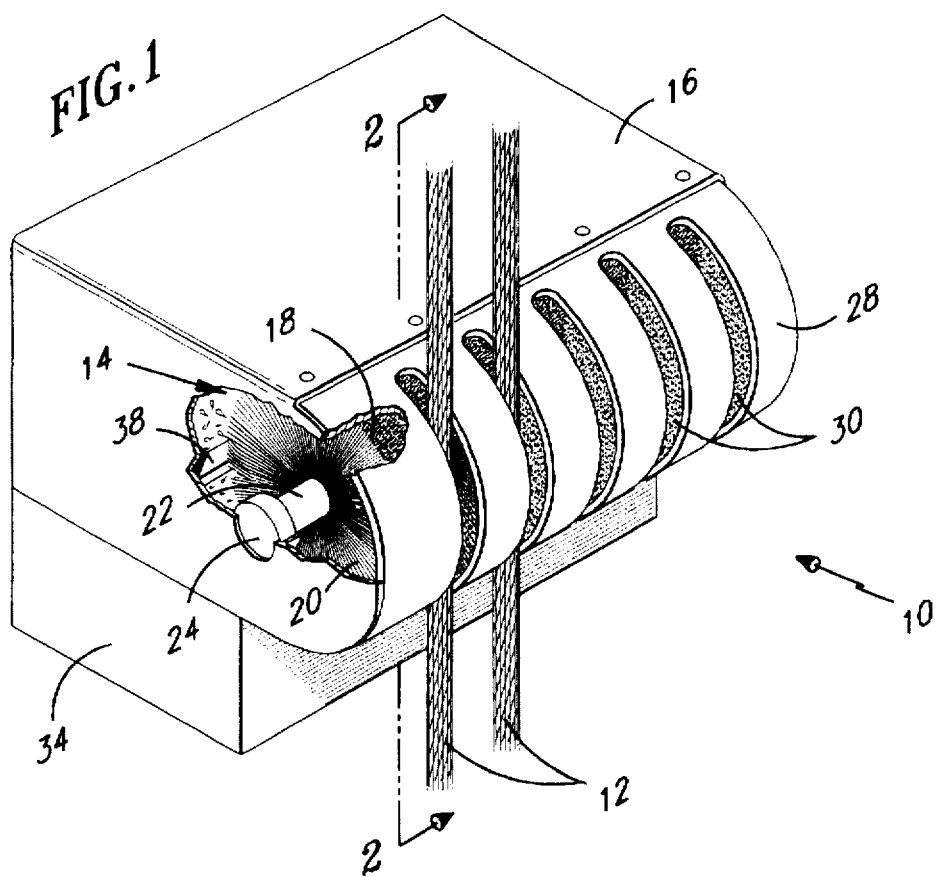
FIG. 1 is a cut away, perspective view of a cleaning device for removing sludge build-up from elevator ropes.

Referring to FIG. 1, a cleaning device 10 for removing sludge from the elevator ropes 12 includes a brush assembly 14 mounted in a housing 16. The brush assembly 14 includes a round brush 18 with bristles 20 protruding radially outward from the center of the brush 18. The brush 18 is mounted on an elongated shaft 22 supported by the housing 16. A plurality of bearings 24 fit onto the shaft 22 to insure smooth rotation of the brush assembly 14.

The housing 16 supporting the shaft 22 of the brush 18 encloses a portion of the circumference of the round brush 18. A guard 28 is removably secured to the housing 16 so that the portion of the round brush 18 protruding from the housing 16 is enclosed by the guard 28. A plurality of slots 30 is formed in the guard 28. Each slot 30 is sufficiently wide to accommodate the diameter of the elevator rope 12. The length of the slots 30 is selected to allow each elevator rope 12 passing through the slot to come into contact with the bristles 20 of the round brush 18 and to allow interference between the elevator rope 12 and the bristles 20. For the best results, the amount of interference between the elevator rope 12 and the bristles 20 of the brush 18 should be approximately one (1) inch. The number of slots 30 within the guard 28 corresponds to the number of elevator ropes 12 that need to be cleaned.

A receptacle 34 is removably mounted on a bottom portion of the housing 16. The receptacle 34 has a certain depth to accommodate a certain volume of the removed sludge.

Figure 2:
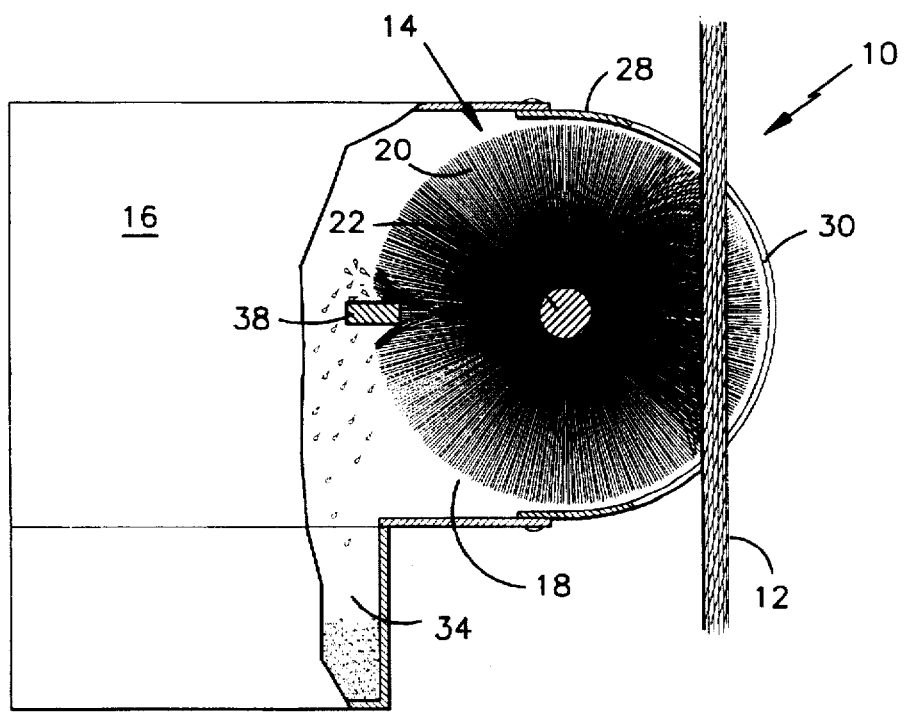
FIG. 2 is a sectional view of the cleaning device of FIG. 1 taken along the line 2—2.

A cleaning bar 38 is mounted within the housing 16 and spans the width of the round brush 18. The cleaning bar 38 is positioned to have slight interference with the bristles 20 of the round brush 18, as best seen in FIG. 2.

In operation, the cleaning device 10 is typically placed on the floor of the machine room or on a secondary floor where the elevator ropes are accessible. Each elevator rope 12 passes through the slot 30 of the guard 28 so that the elevator rope is surrounded by the bristles 20 and is in interference with the bristles, as best seen in FIG. 2. As ropes 12 move through the bristles 20 of the brush 18, the sludge is removed from the rope and remains on the bristles of the brush. The brush assembly 14 begins to rotate as the ropes move through the brush. As the brush 18 rotates, the sludge that sticks to the bristles 20 gets removed from the bristles 20 by the cleaning bar 38 which is in interference with the bristles of the brush. The sludge removed from the bristles drops into the removable receptacle 34. The housing 16 and the guard 28 enclosing the brush assembly prevent the sludge from flying into the hoistway and contaminating the surrounding area. The receptacle 34 is periodically removed and cleaned as part of the regular maintenance procedure.

The cleaning bar 38 also impedes the motion of the brush 18 to result in relative motion between the brush 18 and the elevator ropes 12. The relative motion between the brush and the ropes improves the cleaning process of the ropes. The amount of interference between the cleaning bar and the bristles of the round brush depends on the amount of sludge build-up that is characteristic for the specific site. On average, approximately one (1) inch interference is sufficient to effectively clean the bristles of the brush.

One major advantage of the cleaning device of the present invention over the prior art is that the sludge is effectively removed from the elevator ropes without contaminating the hoistway. Another benefit of the present invention is that the sludge collected in the receptacle can be periodically removed without contaminating the hoistway and mechanics' clothing. These features of the present invention eliminate customer complaints about lobbies dirtied by mechanics and reduces the potential fire hazard in the hoistway. Additionally, since the brush is continuously cleaned by the cleaning bar, the brush is always sufficiently clean to remove the sludge from the elevator ropes so that the new lubricating oil can penetrate into the center of the ropes to lubricate the inside wires, thereby significantly reducing wear of the elevator ropes.

The size of the cleaning device and the number of slots 30 are dictated by the number of ropes to be cleaned. The housing can be inexpensively manufactured from sheet metal and the guard can be formed from plastic. Although the present invention discloses a housing and a guard shielding the hoistway from the sludge, the guard 28 can be manufactured as an integral part of the housing. Also, although the present invention utilizes the cleaning bar as a clutch to slow down the rotation of the brush, other clutch mechanisms can be used to perform the same functions.

While the present invention has been illustrated and described with respect to a particular embodiment thereof, it should be appreciated by those of ordinary skill in the art, that various modifications to this invention may be made without departing from the spirit and scope of the present invention.

We claim:

1. A cleaning device for removing sludge from elevator ropes in an elevator, the improvement comprising:
   a brush assembly including a brush, said brush having a plurality of bristles protruding radially outward for engagement with said elevator ropes for removing sludge;
   a housing supporting said brush assembly and enclosing a first portion of said brush; and
   a receptacle removably attached to said housing for collecting said sludge.

2. The cleaning device according to claim 1 further comprising a cleaning bar disposed within said housing to clean said brush from said sludge.

3. The cleaning device according to claim 2 wherein said cleaning bar being in slight interference with said plurality of bristles of said brush.

4. The cleaning device according to claim 2 wherein said cleaning bar provides resistance to said brush to result in relative motion between said brush and said elevator ropes.

5. The cleaning device according to claim 1 further comprising a guard attached onto said housing and enclosing a second portion of said brush.

6. The cleaning device according to claim 5 further comprising a plurality of slots formed within said guard and allowing each said elevator rope to pass through each one of said plurality of slots so that said elevator ropes come into contact with said plurality of bristles of said brush.

7. The cleaning device according to claim 1 further comprising means for providing resistance to said brush to result in relative motion between said brush and said elevator ropes.

8. A cleaning device for removing sludge from elevator ropes comprising:
   a brush assembly including a brush, said brush having a plurality of bristles protruding radially outward;
   a housing supporting said brush assembly and enclosing a first portion of said brush;
   a cleaning bar disposed within said housing and extending the width of said brush assembly to clean said brush from said sludge and
   a guard attaching onto said housing and enclosing a second portion of said brush, a plurality of slots formed within said guard and allowing each said elevator rope to pass through each one of said plurality of slots so that said elevator ropes come into contact with said plurality of bristles of said brush.

9. The cleaning device according to claim 8 further comprising a receptacle removably attached to said housing for collecting said slugde, said receptacle being removable for periodic cleaning of collected sludge.

10. The cleaning device of claim 8 wherein said cleaning bar having a slight interference with said brush for effective removal of said sludge from said plurality of bristles of said round brush.

11. A cleaning device for removing sludge from elevator ropes in an elevator, the improvement comprising:
   a brush assembly including a brush for engagement with said elevator ropes for removing sludge;
   a housing supporting said brush assembly and substantially enclosing said brush; and
   a receptacle removably attached to said housing for collecting said sludge.

12. The cleaning device according to claim 11 further comprising a plurality of slots formed within said housing to allow said elevator rope to pass through each one of said plurality of slots so that said elevator ropes come into contact with bristles of said brush.

13. The cleaning device according to claim 11 further comprising a cleaning bar disposed within said housing to clean said brush from the sludge.

14. The cleaning device according to claim 13 wherein said cleaning bar being in slight interference with bristles of said round brush.

15. The cleaning device according to claim 13 wherein said cleaning bar provides resistance to said brush to result in relative motion between said brush and said elevator ropes.

16. The cleaning device according to claim 11 further comprising means for providing resistance to said brush to result in relative motion between said brush and said elevator ropes.

* * * * *